(12) United States Patent
Huang-Fu et al.

(10) Patent No.: US 12,550,207 B2
(45) Date of Patent: *Feb. 10, 2026

(54) ENHANCED HANDLING OF 5GSM PROCEDURE COLLISION

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 407 days.

This patent is subject to a terminal disclaimer.

(21) Appl. No.: 17/719,077

(22) Filed: Apr. 12, 2022

(65) Prior Publication Data

US 2022/0369393 A1 Nov. 17, 2022

Related U.S. Application Data (60) Provisional application No. 63/187,447, filed on May 12, 2021.

(51) Int. Cl.
*H04W 76/11* (2018.01)
*H04W 36/00* (2009.01)
*H04W 76/38* (2018.01)

(52) U.S. Cl.
CPC ........ *H04W 76/11* (2018.02); *H04W 36/0016* (2013.01); *H04W 36/00224* (2023.05); *H04W 76/38* (2018.02)

(58) Field of Classification Search
CPC . H04W 76/11; H04W 76/38; H04W 36/0016; H04W 76/10; H04W 76/34;

(Continued)

(56) References Cited

U.S. PATENT DOCUMENTS 11,368,937 B2 * 6/2022 Ryu .................. H04W 28/0865
11,523,319 B2 * 12/2022 Ryu ...................... H04W 36/14
(Continued)

FOREIGN PATENT DOCUMENTS

CN    111034267 A    4/2020
CN    111418256 A    7/2020
(Continued)

OTHER PUBLICATIONS

MediaTek Handling for Collision of PDU Session Handover Procedures, 3GPP C1-211454, Feb. 25-Mar. 5, 2021 (Year: 2021).*

*Primary Examiner* — Hassan A Phillips
*Assistant Examiner* — Prenell P Jones
(74) *Attorney, Agent, or Firm* — Helen Mao; Zheng Jin; Imperium Patent Works (57) ABSTRACT

A method for handling a collision of a UE-requested PDU session establishment procedure and a network-requested PDU session release procedure is proposed. When a PDU SESSION ESTABLISHMENT REQUEST message indicates that the UE-requested PDU session establishment request procedure is to handover an existing PDU session between 5G 3GPP access and 5G non-3GPP access, the UE proceeds with the network-requested PDU session release procedure and aborts the UE-requested PDU session establishment procedure. Otherwise, the UE ignores a received PDU SESSION RELEASE COMMAND message and proceeds with the UE-requested PDU session establishment procedure.

16 Claims, 4 Drawing Sheets (58) Field of Classification Search
CPC ..... H04W 76/30; H04W 76/22; H04W 76/12; H04W 76/00; H04W 76/27
See application file for complete search history.

(56) References Cited

U.S. PATENT DOCUMENTS

| | | | |
|---|---|---|---|
| 11,601,990 B2* | 3/2023 | Aramoto | H04W 36/22 |
| 2018/0352483 A1* | 12/2018 | Youn | H04L 63/0272 |
| 2019/0174449 A1* | 6/2019 | Shan | H04W 60/04 |
| 2019/0342851 A1* | 11/2019 | Shan | H04W 76/11 |
| 2020/0100156 A1* | 3/2020 | Liu | H04W 28/0268 |
| 2020/0145940 A1* | 5/2020 | Gage | H04W 36/04 |
| 2020/0163144 A1* | 5/2020 | Ryoo | H04L 47/82 |
| 2020/0323008 A1* | 10/2020 | Pal | H04W 36/0022 |
| 2021/0051653 A1* | 2/2021 | Park | H04W 8/22 |
| 2021/0084528 A1* | 3/2021 | Kim | H04W 28/0289 |
| 2021/0153262 A1* | 5/2021 | Mochizuki | H04W 56/0015 |
| 2021/0204357 A1* | 7/2021 | Tang | H04W 48/16 |
| 2021/0211960 A1* | 7/2021 | Ryu | H04W 76/12 |
| 2021/0314899 A1* | 10/2021 | Shan | H04W 60/04 |
| 2022/0007150 A1* | 1/2022 | Edge | H04W 64/00 |
| 2022/0038902 A1* | 2/2022 | Mueck | H04L 63/1433 |
| 2022/0086744 A1* | 3/2022 | Youn | H04W 76/10 |
| 2022/0117015 A1* | 4/2022 | DeFoy | H04W 76/11 |
| 2022/0132454 A1* | 4/2022 | Youn | H04W 60/00 |
| 2022/0159753 A1* | 5/2022 | Kuo | H04W 76/14 |
| 2022/0167446 A1* | 5/2022 | Youn | H04W 48/16 |
| 2022/0217670 A1* | 7/2022 | Kumar | H04W 60/04 |
| 2022/0256500 A1* | 8/2022 | Gurumoorthy | H04W 68/02 |
| 2022/0264522 A1* | 8/2022 | Brusilovsky | H04W 48/18 |
| 2022/0312374 A1* | 9/2022 | Ryu | H04W 68/005 |
| 2022/0338155 A1* | 10/2022 | Ryu | H04W 76/10 |
| 2022/0345879 A1* | 10/2022 | Park | H04W 80/10 |
| 2022/0369178 A1* | 11/2022 | Liu | H04W 36/0058 |
| 2022/0377545 A1* | 11/2022 | Wang | G08G 5/57 |
| 2023/0102655 A1* | 3/2023 | Wang | H04W 76/15 370/329 |
| 2023/0180301 A1* | 6/2023 | Seidel | H04W 74/006 370/329 |
| 2023/0180349 A1* | 6/2023 | Zhu | H04W 4/06 370/312 |
| 2023/0189132 A1* | 6/2023 | Kim | H04W 88/18 455/435.1 |
| 2023/0209425 A1* | 6/2023 | Da Silva | H04W 36/34 370/331 |
| 2023/0232204 A1* | 7/2023 | Ryu | H04W 8/18 370/329 |
| 2023/0239715 A1* | 7/2023 | Kainulainen | H04W 24/10 370/252 |
| 2023/0254694 A1* | 8/2023 | Ryu | H04W 76/30 455/411 |
| 2023/0292224 A1* | 9/2023 | Shimoda | H04W 48/14 |
| 2023/0328520 A1* | 10/2023 | Ryu | H04W 12/08 455/410 |
| 2023/0337089 A1* | 10/2023 | Ryu | B64U 10/00 |
| 2023/0397155 A1* | 12/2023 | Ryu | H04W 12/082 |
| 2023/0413225 A1* | 12/2023 | Ryu | H04W 24/10 |
| 2024/0080790 A1* | 3/2024 | Totadamane Ramappa | H04W 60/00 |
| 2024/0187887 A1* | 6/2024 | Kim | H04W 24/04 |

FOREIGN PATENT DOCUMENTS

| | | |
|---|---|---|
| CN | 112637963 A | 4/2021 |
| WO | 2021040423 A1 | 3/2021 |

* cited by examiner

ENHANCED HANDLING OF 5GSM PROCEDURE COLLISION

CROSS REFERENCE TO RELATED APPLICATIONS

This application claims priority under 35 U.S.C. § 119 from U.S. Provisional Application No. 63/187,447, entitled "Enhanced Handling of 5GSM Procedure Collision", filed on May 12, 2021, the subject matter of which is incorporated herein by reference.

TECHNICAL FIELD

The disclosed embodiments relate generally to wireless communication, and, more particularly, to method for handling 5GSM PDU session establishment procedure and PDU session release procedure collision.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In 5G/NR, a protocol data unit (PDU) session defines the association between the UE and the data network that provides a PDU connectivity service. The PDU session establishment is a parallel procedure of PDN connection (bearer) procedure in 4G/LTE. Each PDU session is identified by a. PDU session. ID (PSI), and may include multiple QoS flows and QoS rules. Each PDU session can be established via a 5G access network (e.g., 3GPP radio access network (RAN), or via a non-3GPP RAN). Both the network and the UE can initiate different PDU session procedures, e.g., PDU session establishment procedure, PDU session modification procedure, and PDU session release procedure, for managing PDU sessions.

When collision of UE-requested PDU session establishment procedure and network requested PDU session release procedure occurs, typically, UE shall ignore the PDU SESSION RELEASE COMMAND message and proceed with the UE-requested PDU session establishment procedure. However, PDU session establishment procedure may be used for different purposes including initial request, existing PDU session, initial emergency request, existing emergency PDU session, and MA PDU request. The corresponding handlings of the collision under different scenarios should be distinguished.

A solution is sought.

SUMMARY

A method for handling a collision of a UE-requested PDU session establishment procedure and a network-requested PDU session release procedure is proposed. The collision is detected if the UE receives a PDU SESSION RELEASE COMMAND message after sending a PDU SESSION ESTABLISHMENT REQUEST message to the network, and the PDU session ID (PSI) in the PDU SESSION RELEASE COMMAND message is the same as the PDU session ID in the PDU SESSION ESTABLISHMENT REQUEST message. When the request type of the PDU SESSION ESTABLISHMENT REQUEST message indicates that the UE-requested PDU session establishment request procedure is to handover an existing PDU session between 5G 3GPP access and 5G non-3GPP access, the UE proceeds with the network-requested PDU session release procedure and aborts the UE-requested PDU session establishment procedure. Otherwise, the UE ignores the PDU SESSION RELEASE COMMAND message and proceeds with the UE-requested PDU session establishment procedure.

In one embodiment, a UE transmits a protocol data unit (PDU) session establishment request message in a 5G system (5GS) to initiate a UE-requested PDU session establishment procedure. The UE receives a PDU session release command message for a network-requested PDU session release procedure, wherein a PDU session ID (PSI) in the received PDU session release command message is the same as a PSI in the transmitted PDU session establishment request message. The UE determines a release condition based on whether the UE-requested PDU session establishment procedure is to handover an existing PDU session. The UE proceeds with the network-requested PDU session release procedure when the release condition is satisfied, wherein the UE aborts the UE-requested PDU session establishment procedure. The UE otherwise ignores the PDU session release command message when the condition is not satisfied. In one embodiment, UE determines that the release condition is satisfied and releases the PDU session when the PDU session establishment request message includes a request type, which indicates that the UE-requested PDU session establishment request procedure is to handover an existing PDU session between 5G 3GPP access and 5G non-3GPP access.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
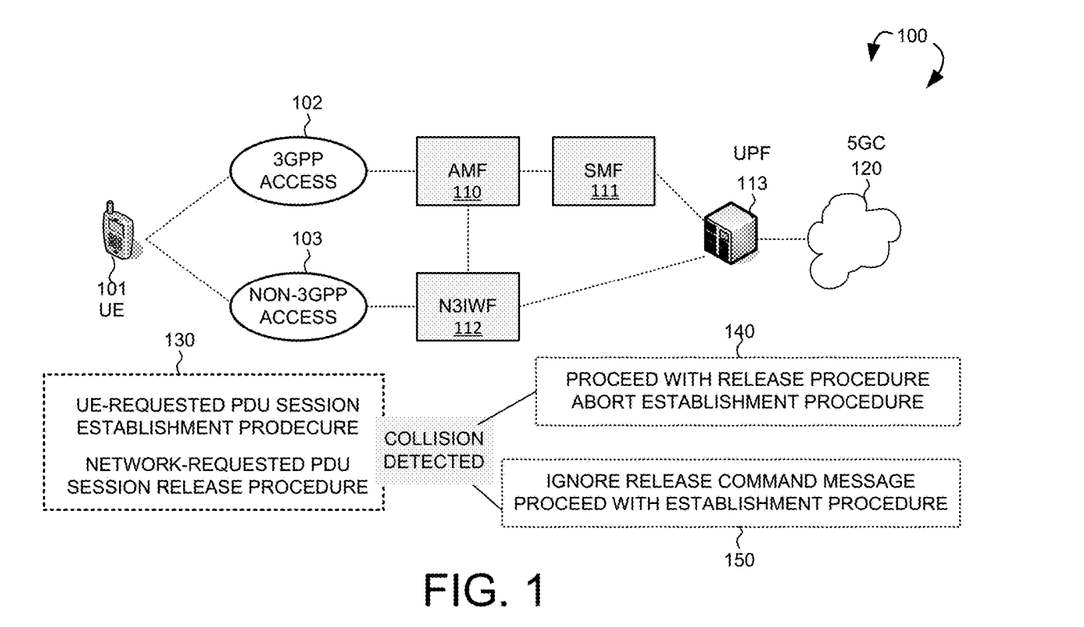
FIG. 1 illustrates an exemplary 5G network supporting protocol data unit (PDU) session management and a method for PDU session procedure collision handling in accordance with one novel aspect.

FIG. 1 illustrates an exemplary 5G network 100 supporting protocol data unit (PDU) session management and a method for PDU session procedure collision handling in accordance with one novel aspect. 5G new radio (NR) network 100 includes a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, an Non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating and removing PDU sessions and managing session context with the UPF 113. The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

5GS networks are packet-switched (PS) Internet Protocol (IP) networks. When a UE joins an evolved packet system (EPS) network, a Packet Data Network (PDN) address (i.e., the one that can be used on the PDN) is assigned to the UE for its connector to the PDN. In 4G, EPS has defined a Default EPS Bearer to provide the IP Connectivity that is Always-On. In 5G, a PDU session establishment procedure is a parallel procedure of a PDN connection procedure in 4G. A PDU session defines the association between the UE and the data network that provides a PDU connectivity service. Each PDU session is identified by a PDU session ID, and can be established over a 3GPP RAN, and/or over a non-3GPP RAN for radio access. 5G session management (5GSM) for PDU sessions over both 3GPP access and non-3GPP access are managed by AMF and SMF via NAS signaling. In 5G, a multi-access (MA) PDU session uses one 3GPP access network or one non-3GPP access network at a time, or simultaneously one 3GPP access network and one non-3GPP access network.

Both the network and the UE can initiate different PDU session procedures, e.g., PDU session establishment procedure, PDU session modification procedure, and PDU session release procedure, for managing PDU sessions. When collision of UE-requested PDU session establishment procedure and network-requested PDU session release procedure occurs, typically, UE shall ignore the PDU SESSION RELEASE COMMAND message and proceed with the UE-requested PDU session establishment procedure. However, PDU session establishment procedure may be used for different purposes including initial request, existing PDU session, initial emergency request, existing emergency PDU session, and MA PDU request. The corresponding handlings of the collision under different scenarios should be distinguished.

In accordance with one novel aspect, explicit UE behaviors are proposed to handle a collision of the UE-requested PDU session establishment procedure and the network-requested PDU session release procedure (as depicted by 130). The collision is detected if the UE 101 receives a PDU SESSION RELEASE COMMAND message after sending a PDU SESSION ESTABLISHMENT REQUEST message to the network, and the PDU session ID in the PDU SESSION RELEASE COMMAND message is the same as the PDU session ID in the PDU SESSION ESTABLISHMENT REQUEST message. If the UE-requested PDU session establishment procedure is for handover an existing PDU session between 5G 3GPP and 5G non-3GPP access, then as depicted by 140, UE 101 proceeds with the network-requested PDU session release procedure for releasing the PDU session, aborts the UE-requested PDU session establishment procedure, stops timer T3580, releases the allocated Procedure Transaction Identifier (PTI), and enters the state PROCEDURE TRANSACTION INACTIVE. Otherwise, as depicted by 150, UE 101 ignores the PDU SESSION RELEASE COMMAND message and proceeds with the UE-requested PDU session establishment procedure.

Figure 2:
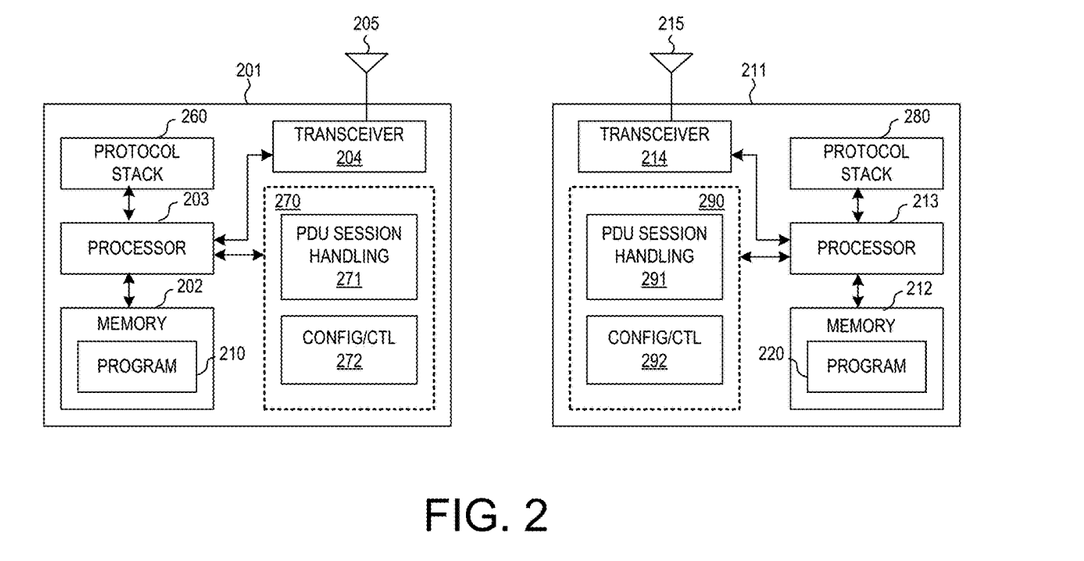
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modification, and release procedures, and configuration and control circuit 292 that provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs PDU session establishment, modification, and release procedures with the network, and a config and control circuit 272 that handles configuration and control parameters for mobility management and session management. Upon detecting a collision between a UE-requested PDU session establishment procedure and a network-requested PDU session release procedure, UE decides whether to proceeds with the network-requested PDU session release procedure and aborts the UE-requested PDU session establishment procedure, or ignores the PDU SESSION RELEASE COMMAND message and proceeds with the UE-requested PDU session establishment procedure.

Figure 3:
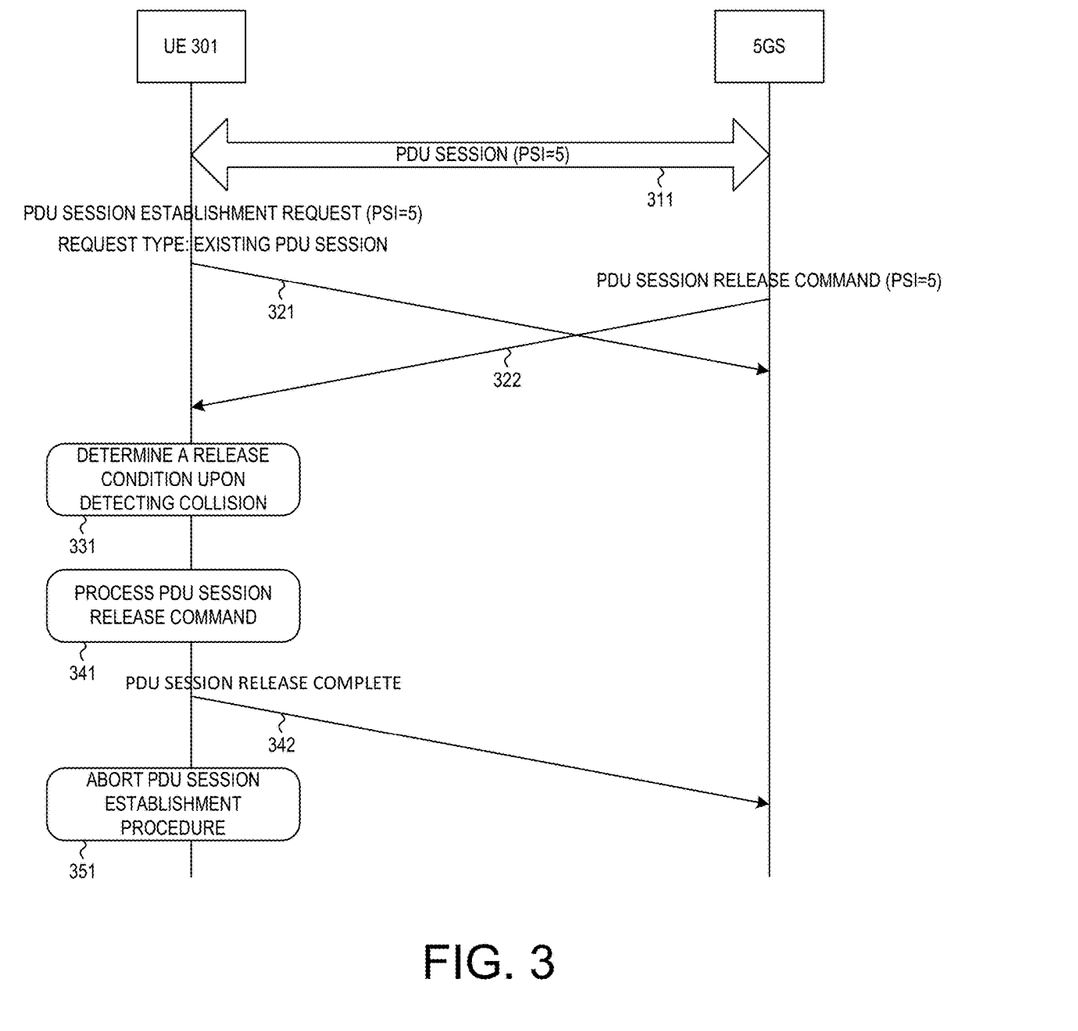
FIG. 3 illustrates one embodiment of PDU session establishment handling when UE also receives a PDU session release command from the network in accordance with one novel aspect.

FIG. 3 illustrates one embodiment of PDU session establishment handling when UE also receives a PDU session release command from the network in accordance with one novel aspect. In step 311, UE 301 establishes and/or maintains one or more PDU session(s). For example, one of the PDU sessions has PSI=5 is established between UE 301 and the 5GS network over 3GPP access type or over non-3GPP access type. In step 321, UE 301 triggers a UE-requested PDU session establishment procedure by sending a PDU SESSION ESTABLISHMENT REQUEST message over the other e.g., non-3GPP access type or 3GPP access type, for the PDU session (PSI=5). In step 322, UE 301 receives a PDU SESSION RELEASE COMMAND message for the same PDU session (PSI=5), after the UE-requested PDU session establishment procedure is triggered, but before the UE-requested PDU session establishment procedure is completed. Accordingly, UE 301 detects a collision between the UE-requested PDU session establishment procedure and the network-requested PDU session release procedure. The collision is detected when UE 301 receives a PDU SESSION RELEASE COMMAND message after sending a PDU SESSION ESTABLISHMENT REQUEST message to the network, and the PDU session ID in the PDU SESSION RELEASE COMMAND message is the same as the PDU session ID in the PDU SESSION ESTABLISHMENT REQUEST message.

Typically, when the collision is detected, the UE should ignore the PDU SESSION RELEASE COMMAND message and proceed with the UE-requested PDU session establishment procedure. The reason is that the PDU SESSION RELEASE COMMAND message is probably a retransmission or an error from the network and is not valid, so that UE should proceed with the UE-requested PDU session establishment procedure. However, a PDU session establishment procedure may be used for different purposes: 1) initial request; 2) existing PDU session; 3) initial emergency request; 4) existing emergency PDU session; and 5) MA PDU request. Under most scenarios, the UE should ignore the PDU SESSION RELEASE COMMAND message, especially when the UE wants to establish a new PDU session. Under certain other scenario, however, the UE may want to handover an existing PDU session using the PDU session establishment procedure. Accordingly, the network may indeed intend to release the existing PDU session, and therefore the UE should proceed with the PDU session release procedure and abort the PDU session establishment procedure.

In step 331, UE 301 determines whether a release condition is satisfied for a corresponding handling of the detected collision. If the PDU SESSION ESTABLISHMENT REQUEST message was sent with a request type set to "existing PDU session", or "existing emergency PDU session" in order for the handover of an existing PDU session (e.g., PSI=5) between 3GPP access and non-3GPP access, then the release condition is satisfied. Accordingly, UE 301 proceeds with the network-requested PDU session release procedure, and aborts the PDU session establishment procedure. Therefore, in step 341, UE 301 proceeds with the network-requested PDU session release procedure for releasing the PDU session (PSI=5). In step 342, UE 301 sends a PDU SESSION RELEASE COMPLETE message to 5GS. In step 351, UE 301 aborts the UE-requested PDU session establishment procedure, stops timer T3580, releases the allocated PTI, and enters the state PROCEDURE TRANSACTION INACTIVE. The order of steps 341, 342 and 351 can be different, e.g., step 351 can be performed by UE 301 first, followed by steps 341 and 342.

Figure 4:
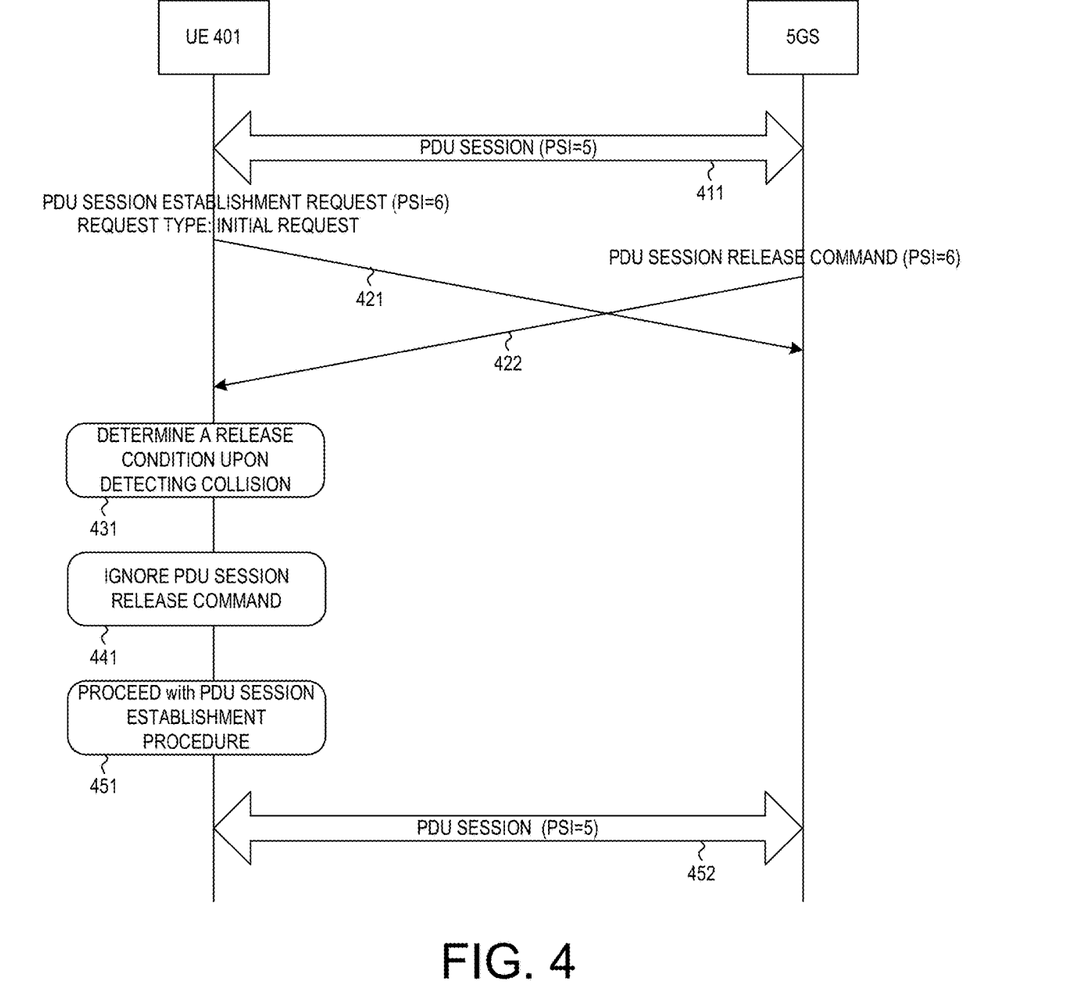
FIG. 4 illustrates another embodiment of PDU session establishment handling when UE also receives a PDU session release command from the network in accordance with one novel aspect.

FIG. 4 illustrates another embodiment of PDU session establishment handling when UE also receives a PDU session release command from the network in accordance with one novel aspect. In step 411, UE 401 establishes and/or maintains one or more PDU session(s). For example, one of the PDU sessions has PSI=5 is established between UE 401 and the 5GS network over 3GPP access type or over non-3GPP access type. In step 421, UE 401 triggers a UE-requested PDU session establishment procedure by sending a PDU SESSION ESTABLISHMENT REQUEST message over non-3GPP access type, for a PDU session (e.g., PSI=6). In step 422, UE 401 receives a PDU SESSION RELEASE COMMAND message for the same PDU session (PSI=6), after the UE-requested PDU session establishment procedure is triggered, but before the UE-requested PDU session establishment procedure is completed. Accordingly, UE 401 detects a collision between the UE-requested PDU session establishment procedure and the network-requested PDU session release procedure. The collision is detected when UE 401 receives a PDU SESSION RELEASE COMMAND message after sending a PDU SESSION ESTABLISHMENT REQUEST message to the network, and the PDU session ID in the PDU SESSION RELEASE COMMAND message is the same as the PDU session ID in the PDU SESSION ESTABLISHMENT REQUEST message.

As explained earlier with respect to FIG. 3, upon detecting the collision, UE needs to determine how to handle the collision based on a release condition. In step 431, UE 401 determines whether the release condition is satisfied for a corresponding handling of the detected collision. In a first scenario, if the PDU SESSION ESTABLISHMENT REQUEST message was sent with a request type set to "initial request", or "initial emergency request", or "MA PDU request" in order to establish a new PDU session having PSI=6, then the release condition is not satisfied. In a second scenario, if the PDU SESSION ESTABLISHMENT REQUEST message was sent with a request type set to "existing PDU session", or "existing emergency PDU session" in order for the handover of an existing PDU session (e.g., PSI=5) between a PDN connection (S1 mode or ePDG) and a 5G PDU session (N1 mode), then the release condition is not satisfied.

When UE determines that the release condition is not satisfied, e.g., the network-requested PDU session release might be a retransmission or an error, UE should ignore the release command message. Accordingly, UE 401 proceeds with the UE-requested PDU session establishment procedure and does not perform the network-requested PDU session release procedure. As a result, in step 441, UE 401 decides to ignore the PDU SESSION RELEASE COMMAND message for releasing the PDU session. In step 451, UE 401 decides to proceed with UE-requested PDU session establishment procedure. In step 452, a new PDU session (e.g., PSI=6) is established between UE 401 and 5GS over 3GPP and/or non-3GPP access type.

Figure 5:
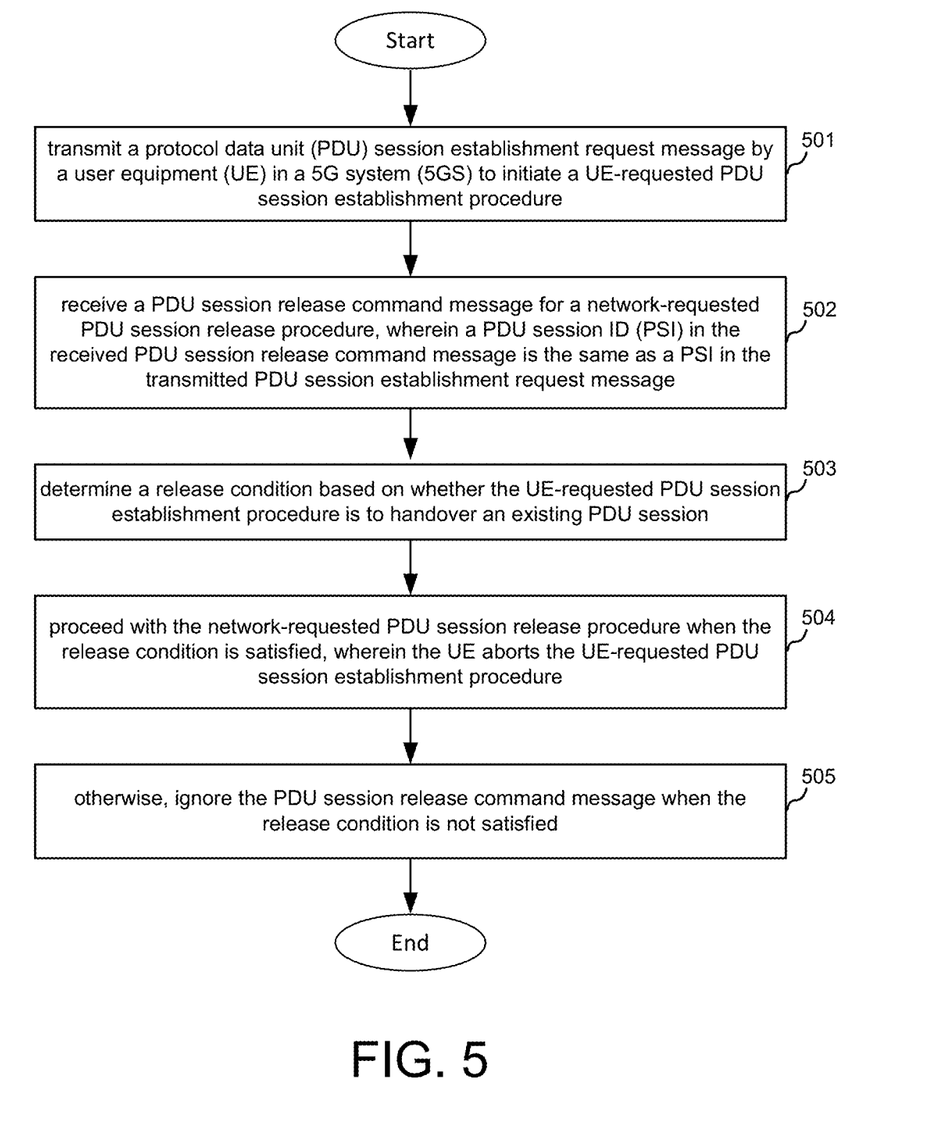
FIG. 5 is a flow chart of a method of handling PDU session procedure collision in accordance with one novel aspect of the present invention.

FIG. 5 is a flow chart of a method of handling PDU session establishment in accordance with one novel aspect of the present invention. In step 501, a UE transmits a protocol data unit (PDU) session establishment request message in a 5G system (5GS) to initiate a UE-requested PDU session establishment procedure. In step 502, the UE receives a PDU session release command message for a network-requested PDU session release procedure, wherein a PDU session ID (PSI) in the received PDU session release command message is the same as a PSI in the transmitted PDU session establishment request message. In step 503, the UE determines a release condition based on whether the UE-requested PDU session establishment procedure is to handover an existing PDU session. In step 504, the UE proceeds with the network-requested PDU session release procedure when the release condition is satisfied, wherein the UE aborts the UE-requested PDU session establishment procedure. In step 505, the UE otherwise ignores the PDU session release command message when the release condition is not satisfied. In one embodiment, UE determines that the release condition is satisfied when the PDU session establishment request message includes a request type, which indicates that the UE-requested PDU session establishment request procedure is to handover an existing PDU session between 5G 3GPP access and 5G non-3GPP access.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
transmitting a protocol data unit (PDU) session establishment request message by a user equipment (UE) in a 5G system (5GS) to initiate a UE-requested PDU session establishment procedure;
detecting a UE-network collision upon receiving a PDU session release command message for a network-requested PDU session release procedure with a PDU session ID (PSI) in the received PDU session release command message being the same as a PSI in the transmitted PDU session establishment request message;
determining a release condition for the detected UE-network collision based on the UE-requested PDU session establishment procedure, wherein the release condition is satisfied when the UE-requested PDU session establishment procedure is to handover an existing PDU session; and
proceeding with the network-requested PDU session release procedure when the release condition is satisfied, wherein the UE aborts the UE-requested PDU session establishment procedure, otherwise,
ignoring the PDU session release command message when the release condition is not satisfied.

2. The method of claim 1, wherein the PDU session establishment request message carries a request type indicating whether the request is an initial request or is for an existing PDU session.

3. The method of claim 2, wherein the release condition is satisfied when the request type indicates that the UE-requested PDU session establishment request procedure is to handover an existing PDU session between 5G 3GPP access and 5G non-3GPP access.

4. The method of claim 1, wherein the network-requested PDU session release procedure involves UE transmitting a PDU session release complete message or a 5G session management (5GSM) status message to the 5GS.

5. The method of claim 1, wherein the aborting of the UE-requested PDU session establishment procedure involves UE stopping timer T3580, releasing an allocated Procedure Transaction identifier (PTI), and entering PROCEDURE TRANSACTION INACTIVE state.

6. The method of claim 2, wherein the UE determines that the release condition is not satisfied when the request type indicates that the UE-requested PDU session establishment request procedure is to establish a new PDU session.

7. The method of claim 2, wherein the UE determines that the release condition is not satisfied when the request type indicates that the UE-requested PDU session establishment request procedure is to handover an existing PDU session from S1 mode to N1 mode.

8. The method of claim 1, wherein the UE proceeds with the UE-requested PDU session establishment procedure when the release condition is not satisfied.

9. A User Equipment (UE), comprising:
a transmitter that transmits a protocol data unit (PDU) session establishment request message in a 5G system (5GS) to initiate a UE-requested PDU session establishment procedure;
a receiver that detects a UE-network collision upon receiving a PDU session release command message for a network-requested PDU session release procedure with a PDU session ID (PSI) in the received PDU session release command message being the same as a PSI in the transmitted PDU session establishment request message;

a control circuit that determines a release condition for the detected UE-network collision based on the UE-requested PDU session establishment procedure, wherein the release condition is satisfied when the UE-requested PDU session establishment procedure is to handover an existing PDU session; and a PDU session handling circuit that proceeds with the network-requested PDU session release procedure when the release condition is satisfied, wherein the UE aborts the UE-requested PDU session establishment procedure, otherwise, ignores the PDU session release command message when the release condition is not satisfied.

10. The UE of claim 9, wherein the PDU session establishment request message carries a request type indicating whether the request is an initial request or is for an existing PDU session.

11. The UE of claim 10, wherein the release condition is satisfied when the request type indicates that the UE-requested PDU session establishment request procedure is to handover an existing PDU session between 5G 3GPP access and 5G non-3GPP access.

12. The UE of claim 9, wherein the network-requested PDU session release procedure involves UE transmitting a PDU session release complete message or a 5G session management (5GSM) status message to the 5GS.

13. The UE of claim 9, wherein the aborting of the UE-requested PDU session establishment procedure involves UE stopping timer T3580, releasing an allocated and entering PROCEDURE TRANSACTION INACTIVE state.

14. The UE of claim 10, wherein the UE determines that the release condition is not satisfied when the request type indicates that the UE-requested PDU session establishment request procedure is to establish a new PDU session.

15. The UE of claim 10, wherein the UE determines that the release condition is not satisfied when the request type indicates that the UE-requested PDU session establishment request procedure is to handover an existing PDU session from S1 mode to N1 mode.

16. The UE of claim 9, wherein the UE proceeds with the UE-requested PDU session establishment procedure when the release condition is not satisfied.

* * * * *